United States Patent [19]
Sato

[11] Patent Number: 5,982,763
[45] Date of Patent: Nov. 9, 1999

[54] RECEPTION TIMING DETECTION CIRCUIT OF CDMA RECEIVER AND DETECTION METHOD

[75] Inventor: Toshifumi Sato, Tokyo, Japan

[73] Assignee: NEC Corporation, Japan

[21] Appl. No.: 08/892,497

[22] Filed: Jul. 14, 1997

[30] Foreign Application Priority Data

Jul. 15, 1996 [JP] Japan ................................. 8-185103

[51] Int. Cl.⁶ .......................... H04B 7/126; H04B 15/00; H04L 27/14
[52] U.S. Cl. .......................... 370/342; 370/335; 375/208; 375/210; 375/343
[58] Field of Search ................................. 370/335, 342, 370/490; 375/200, 207, 208, 210, 224; 455/67.1

[56] References Cited

U.S. PATENT DOCUMENTS

| | | | |
|---|---|---|---|
| 5,554,156 | 9/1996 | Teder et al. | 370/342 |
| 5,799,038 | 8/1998 | Nowara et al. | 375/224 |
| 5,838,672 | 11/1998 | Ranta | 370/335 |
| 5,896,423 | 4/1999 | Okamoto | 375/208 |
| 5,898,665 | 4/1999 | Sawahashi et al. | 370/342 |

FOREIGN PATENT DOCUMENTS 4-347944  12/1992  Japan.

*Primary Examiner*—Hassan Kizou
*Assistant Examiner*—Afsar M. Qureshi
*Attorney, Agent, or Firm*—Ostrolenk, Faber, Gerb, Soffen, LLP

[57] ABSTRACT

A reception timing detection circuit of a CDMA receiver comprises an A/D converter 101 for obtaining a digital reception signal S, a correlator 102 for obtaining a cross-correlation between the digital reception signal S and a known signal series periodically within a predetermined lag, an interpolation filter 103 for re-sampling the signal R output from the correlator 102 at a frequency higher than a sampling frequency for the A/D converter 101, a power calculation section 104 for obtaining the re-sampled cross-correlation signal power P, an averaging section 105 for averaging the cross-correlation signal power P over a plurality of cycles, and a peak detection section 106 for obtaining a peak Popt of the averaged cross-correlation signal power P and determining an optimum reception timing τ opt.

16 Claims, 9 Drawing Sheets

RECEPTION TIMING DETECTION CIRCUIT OF CDMA RECEIVER AND DETECTION METHOD

BACKGROUND OF THE INVENTION

The present invention relates to a transmitter/receiver of a mobile communication system, especially an automobile phone/handy phone system (cellular system) using a direct spread code division multiple access (DS-CDMA) system and, more particularly, to a reception timing detection circuit of a receiver used in a base station.

Among many mobile communication systems, North America Standard system (TIA IS95) using a code division multiple access (CDMA) method is well known as the digital automobile phone/handy phone system (cellular system). The standard specification TIA/EIA/IS (INTERIM STANDARD) titled "Mobile Station—Base Station Compatibility Standard for Dual-Mode Wideband Spread Spectrum Cellular System PN-3421" was published on May, 1994 by TIA (Telecommunication Industry Association). The above specification describes the required operation of the mobile station in Chapter 6 of 95-A and the required operation of the base station in Chapter 7. This standard specification mainly aims at standardizing radio interface by specifying modulation method, signal format and the like. However the exact reception method is not specified in detail.

On the downlink channel from the base station to the mobile station, common pilot channel (PLCH) not data modulated is transmitted using relatively high power in addition to data modulated traffic channel (TCH) of a plurality of users. The mobile station is able to decide the optimum reception timing using the pilot channel. Therefore determination of the reception timing under a low Eb/No (the ratio of noise power per Hz to signal power per bit) condition is considered as a minor problem. In order to transmit the pilot channel using high power, the number of traffic channels through which data are actually transmitted has to be reduced. This leads to decrease the number of users per base station.

The uplink channel of IS-95-A from the mobile station to the base station employs a modulation method as a combination of modulation and 4 times direct spread using 64-ary orthogonal code and no common pilot channel thereon. Using the 64-ary orthogonal code allows for enhancing power per symbol compared with BPSK, QPSK and the like and prevents deterioration accompanied with coherent detection in spite of using a coherent detection. This results in, however, complicated reception method.

Main items of the IS-95-A are:

chip rate : 1.2288 Mcps;

bit rate : 9.6 kbps; and spreading ratio of direct spread : 128 times.

The chip rate is relatively low and chip cycle is relatively longer than that of instantaneous variable amplitude of propagation delay. Therefore the reception characteristics are hardly susceptible to the effect of insufficient characteristics of the reception timing detection circuit. However, both bit rate and chip rate have to be accelerated at least 5 to 10 times higher for executing high-rate data communication as well as voice data. This problem has never been posed by the IS-95-A.

The conventional reception timing detection method (chip synchronization) is described in the document titled "Principle of Spread Spectrum Communication" written by Andrew J. Viterbi, published on April, 1995, Chapter 3, pp. 39–66. The signal that has been spread with a spread code as pseudo random code is captured at two phases, initial Searching synchronous and tracking synchronous.

In the initial searching synchronous method, serial search is executed by sliding the reception timing by 1/2 chip interval until the correlation power exceeds a given threshold value as described in Chapter 3, section 4 of the above document.

In the tracking synchronous method, called as "early-late gate" or "delay lock loop" (DLL), the timing is finely adjusted by obtaining the correlation power at the timing ahead the reception delay time by $\Delta t$ and the correlation power at the timing behind the reception delay time by $\Delta t$ so as to make the difference zero.

A publication of JP-A 34794/1992 discloses the method in which the above-described initial searching synchronous and tracking synchronous methods are improved, the circuit is shared and the function for tracking the multiple propagation path is added. The basic operation of this method is identical to that of the reference as described above, failing to solve the task of the IS-95-A.

The code division multiple access (CDMA) method realizes communication that satisfies quality requirement under a very low Eb/No condition by employing such technologies as path diversity using multiple path propagation (RAKE), macro diversity for connecting a plurality of base stations around the cell boundary (soft hand off), error correction code exhibiting high encoding gain, transmission power control and the like.

The CDMA method requires strict synchronization of chip timing for reception. If the number of diversity branch (the number of path) increases, the correct path timing has to be detected under a very low Eb/No condition per path.

In the conventional method for obtaining a correlation value by sliding a correlation timing and detecting the timing when the correlation power becomes maximum, especially when the noise power is higher than the signal power, failure in peak detection frequently occurs owing to noise. This is the first problem of the conventional art.

The power of the correlation per symbol is obtained by summing the signal power and the noise power. When the correlation value power is averaged over a plurality of symbols, dispersion of the measured correlation values is decreased. However, the original correlation peak is too small to detect the right peak. This is the first reason.

In the conventional method, the reception signal does not always coincide with the one that has been used for calculating the correlation value with different delays. In case the reception level varies to the greatest degree owing to fading, the peak of the sliding correlation value does not always coincide with the peak of the right delay profile. This is the second reason.

In order to obtain the peak of the delay profile accurately, the conventional method requires a large amount of correlation operation. This is the second problem that should be solved.

The conventional method obtains power of the correlation values and further the average value of the obtained power. As the process for obtaining the power contains a square operation (non-linear operation), linearity is no longer retained, allowing for no interpolation of the delay profile. Therefore, the correlation value has to be calculated by changing the delay time with the intended accuracy.

As the third problem, the conventional method requires a large sized hardware.

More specifically, two types of circuits, initial searching synchronization circuit (search circuit) and tracking synchronization circuit (for example, delay lock loop: DLL) are required to cope with the change in the propagation condition resulted from the initial timing capture, secondary synchronization capture after getting off the synchronization, shadowing, or the like, resulting in an enlarged hardware.

SUMMARY OF THE INVENTION

It is an objective of the present invention to provide a reception timing detection circuit of a CDMA receiver of a mobile communication system employing a code division multiple access (CDMA) method, allowing for obtaining the delay profile with high accuracy under a low Eb/No environment condition, requiring least calculation amount, thus improving reception quality of the CDMA receiver and saving power consumption.

The present invention provides A reception timing detection circuit of a CDMA receiver used for a mobile communication system using a direct spread code division multiple access method comprising correlation means for obtaining a cross-correlation between a reception signal and a known signal series periodically within a predetermined lag and outputting a cross-correlation signal indicating said obtained cross-correlation, an interpolation filter for re-sampling said cross-correlation signal at a frequency higher than a sampling frequency for said cross-correlation signal and outputting said re-sampled cross-correlation signal, power calculation means for calculating power of said re-sampled cross-correlation signal, averaging means for averaging said calculated power of cross-correlation signal over a plurality of cycles and peak detection means for detecting a peak of said averaged power of cross-correlation signal and determining a timing at which said peak is detected as a reception timing.

The present invention obtains a cross-correlation between a reception signal and a known signal series comprising a plurality of symbols so as to decrease the power of noise component contained in the cross-correlation power.

The cross-correlation is obtained at the minimum number of sampling frequency selected from the frequency bandwidth of the transmission/reception signal. The obtained cross-correlation value is interpolated through an interpolation filter so that cross-correlation power, i.e., peak of the delay profile is detected with a desired delay accuracy. Therefore the operation amount required for obtaining the cross-correlation can be reduced. Since the present invention uses the same reception signal for calculating all the cross-correlation values, the correlation value never varies accompanied with variation of the reception level due to fading.

BRIEF DESCRIPTION OF THE DRAWINGS

This and other objectives, features and advantages of the present invention will become more apparent upon a reading of the following detailed description and drawings, in which.

DESCRIPTION OF PREFERRED EMBODIMENTS

Figure 1:
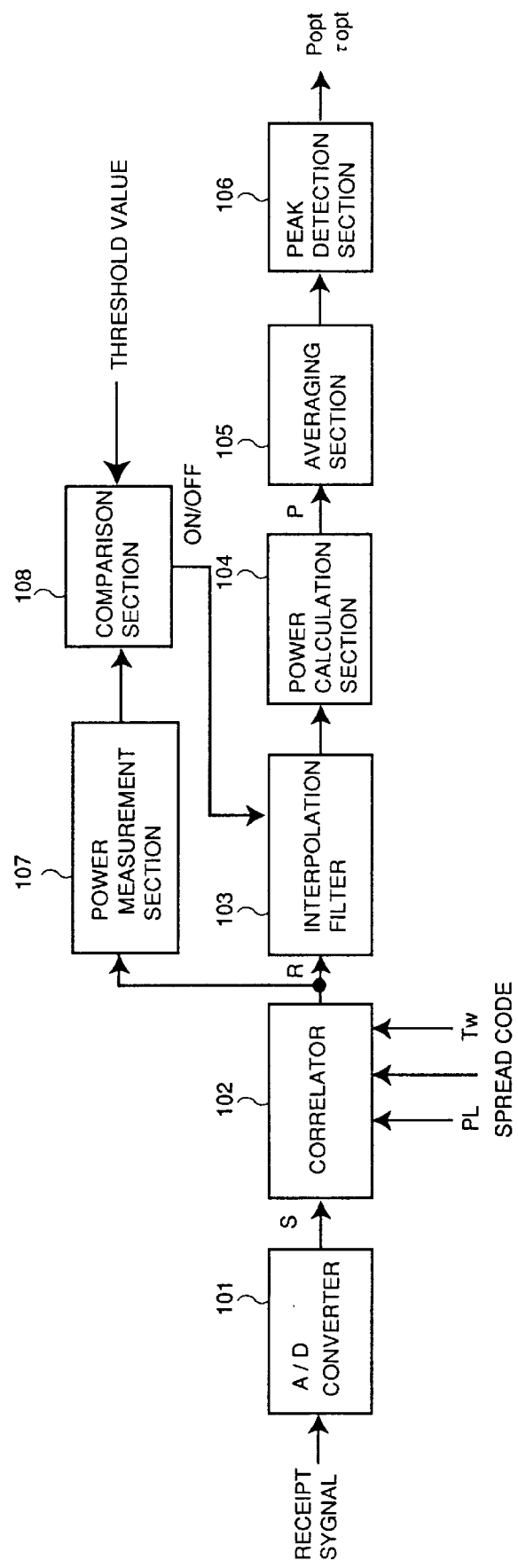
FIG. 1 is a block diagram of a reception timing detection circuit of a CDMA receiver of a first embodiment of the present invention.

Embodiments of the present invention are described referring to the drawings.

FIG. 1 is a block diagram of a reception timing detection circuit of a CDMA receiver of a first embodiment of the present invention.

Referring to FIG. 1, the reception timing detection circuit of the CDMA receiver comprises an A/D converter 101 for converting a reception signal into a digital reception signal S, a correlator 102 for obtaining a cross-correlation between the digital reception signal S and a known signal series periodically within a predetermined lag (within a delay period), an interpolation filter 103 for re-sampling an output signal R of the correlator 102 at a frequency higher than the sampling frequency of the A/D converter 101, a power calculation section 104 for obtaining the cross-correlation signal power P that has been re-sampled at the interpolation filter 103, an averaging section 105 for averaging the cross-correlation signal power P over a plurality of cycles and a peak detection section 106 for obtaining a peak Popt of the cross-correlation signal power P that has been averaged by the averaging section 105 and determining an optimum reception timing τ opt.

The transmission/reception signal that reduces power leaking from the band is band limited with a raised cosine filter exhibiting a roll off factor ranging from 10 to 50%. In this case, the frequency bandwidth of the transmission/reception signal is kept to be 1.1 to 1.5 times more than the chip rate. When digitizing a radio band signal that has been converted into a complex base band signal, the sampling frequency for the A/D converter 101 should be at least twice the chip rate. The in-phase component (I component) and orthogonal component (Q component) of the complex base band signal are A/D converted, respectively to obtain the digital reception signal S. The thus obtained digital reception signal S is expressed as a complex number comprising the in-phase component as a real number section and the orthogonal component as an imaginary number section. The digital reception signal S obtained through A/D conversion with an I/F signal at a sampling frequency four times higher than the chip rate also has an equivalent value.

The sampling frequency, as the most effective feature of the present invention, is the minimum frequency shared by the data demodulation section. Accordingly any further higher frequency can be used for sampling. It is also possible that a correlation is obtained through the analogue circuit and then the output signal of the correlator 102 is A/D converted at the aforementioned sampling frequency.

Figure 2:
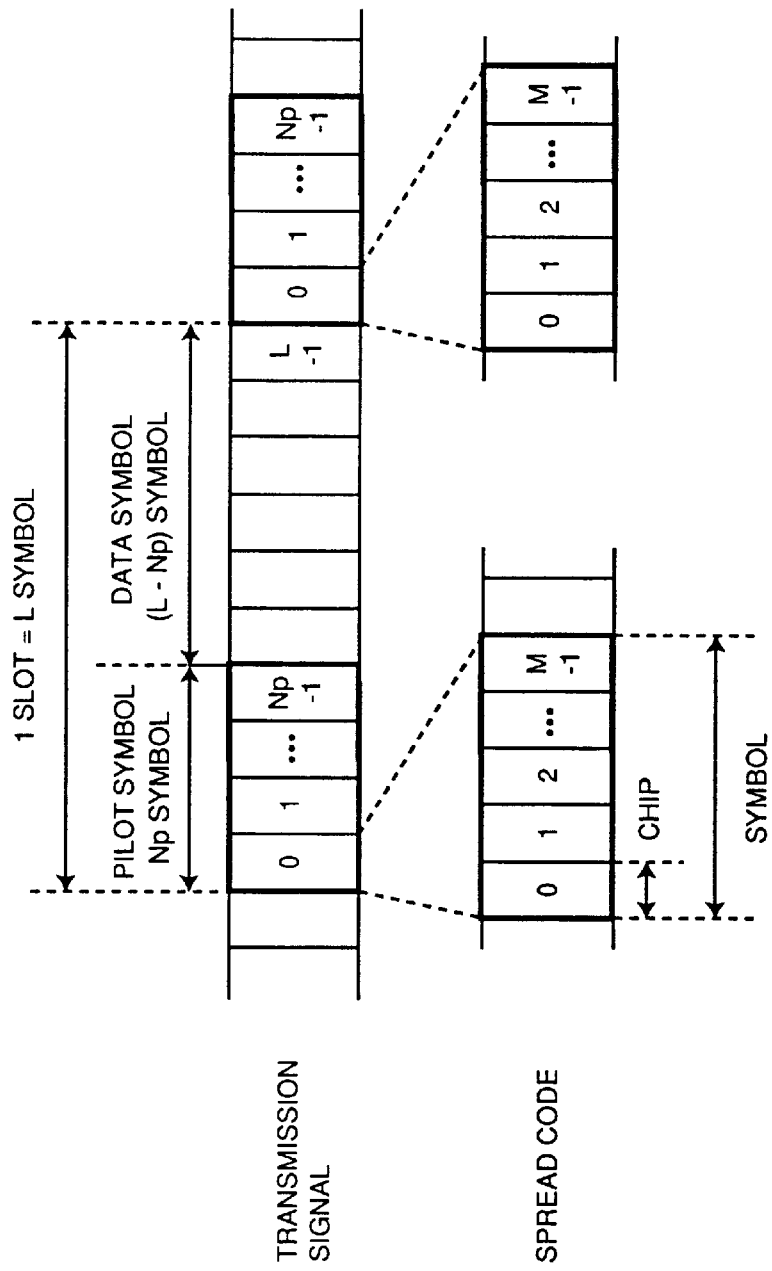
FIG. 2 is a time chart representing each format of a transmission signal and a spread code received by the reception timing detection circuit of the CDMA receiver shown in FIG. 1 as a reception signal.

FIG. 2 is a time chart representing the respective formats of a transmission signal and a spread code received by the CDMA receiver of FIG. 1 as the reception signal.

Referring to FIG. 1 and FIG. 2, the transmission signal has an L symbol equivalent to 1 slot. The Np symbol as the pilot symbol (PL: known code) is inserted to the head of each slot. The spreading ratio (the number of chips of the spread code per symbol) is referred to as M.

The correlator 102 obtains the cross-correlation value $Rn(\tau)$ at the nth slot using the following equation.

Supposing that the known signal series at the nth slot is $Pn(i)$, the known signal length $N=Np \times M$ chip, sampling frequency twice the chip rate used for the reception signal, the period for obtaining the cross-correlation (delay range) Tw is $\tau min$ to $\tau max$, the following equation is established:

$$Rn(\tau)=\Sigma_{i=0 \sim n-1} S(2 \cdot L \cdot M \cdot n+2 \cdot i+\tau) \times \text{conj } (Pn(i))$$

where conj( ) represents a complex conjugate.

The delay range $Tw=\tau min \sim \tau max$ used for obtaining the correlation can be decided as described below. In the cellular system for communication between the base station and mobile station, especially the mobile station is basically expected to return the upstream signal synchronized with the downlink signal from the base station. Accordingly the reception timing is readily predictable for the receiver of the base station. Dispersion of the reception timing is observed in the propagation delay time dependent upon the distance between the base station and the mobile station and synchronous accuracy of the uplink and downlink signals of the mobile unit. The wideband system representative of the CDMA method (for example, ranging from 1 MHz to 20 MHz) is likely to be affected by the propagation delay time rather than the synchronous accuracy of the mobile unit. The maximum propagation time can be derived from the time taken for the wave to run between the maximum cell radius covered by a certain base station. In the receiver of the base station, the minimum value $\tau min$ of the delay range Tw can be derived from subtracting a margin from the delay within the receiver by setting the propagation delay to zero. The maximum value $\tau max$ of the delay range Tw can be derived from adding the margin to the delay within the receiver to the maximum value of the propagation delay. While in the mobile unit, the delay range Tw cannot be obtained in the above manner from the beginning. After synchronizing the clock with the base station by completing the initial synchronization, the delay range can be restricted in the similar manner so that the propagation delay is considered. The interpolation filter 103 interpolates a correlation value between 2 samples per chip output from the series cross-correlator 102 so as to calculate the correlation value with higher delay accuracy. It is required to obtain the correlation value at an interval of 1/4 to 1/16 chip conforming to the allowable timing detection difference and sensitivity deterioration.

Figure 3:
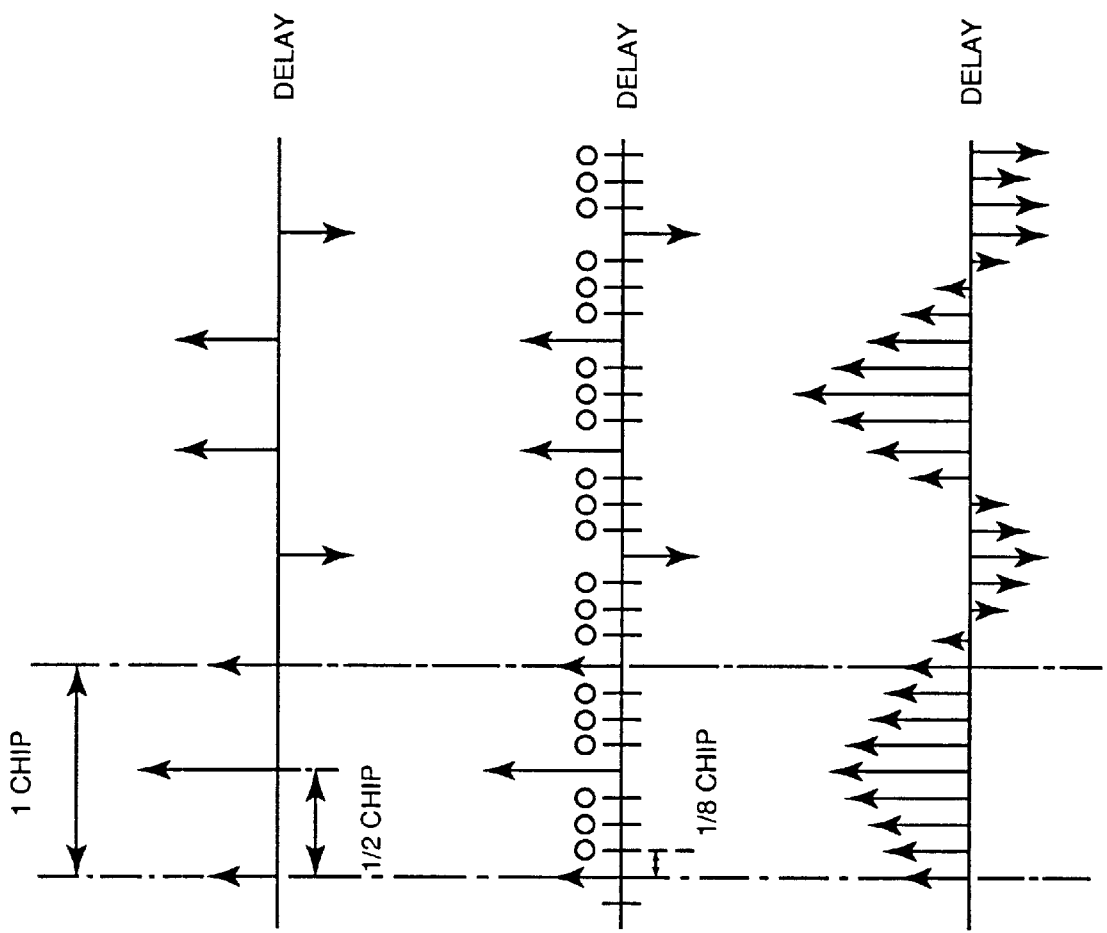
FIGS. 3A to 3C are time charts representing an operation of an interpolation filter of the reception timing detection circuit of the CDMA receiver shown in FIG. 1.

The example for obtaining the cross-correlation value with the accuracy of 1/8 chip is described referring to FIGS. 3A to 3C. Three zeros are inserted between the cross-correlation values at an interval of 1/2 chip (FIG. 3A) output from the correlator 102, respectively so that the signal series at an interval of 1/8 chip is generated (see FIG. 3B). The series at an interval of 1/8 chip is subjected to filtering through a low pass filter (LPF) at cut off frequency identical to the chip rate, thus presenting the cross-correlated series having interpolation at each 1/8 chip interval (FIG. 3C). The impulse response of the LPF can be expressed by the following equation:

$$h(i)=\sin(2\pi \cdot i/8)/(2\pi \cdot i/8).$$

The above impulse response may have a limitless length. Practically it can be restricted to range from $+/-1$ chip to $+/-8$ chip by providing a window, allowing for the use of FIR filter. When the impulse response is restricted to $+/-2$ chip, the number of tap of the FIR filter becomes 16 ((8 samples/chip)×4 chips). As 3 out of 4 samples of the input signal are preliminarily set to zero, adding operation required for calculating the output of 1 sample is executed only 8 times.

In the conventional method without using the interpolation filter to obtain the cross-correlation with 1/8 chip accuracy, the adding operation has to be executed Np×M times per cross-correlation value of 1 sample. While in the present embodiment, the calculation for obtaining the correlation is executed once at 4 samples. As for the rest of 3 times, only 8 times of adding operation are required as described above. Therefore the number of required adding operation is defined by the following equation:

$$(Np \times M+3 \times 8)/4=Np \times M/4+6$$

Normally as it is obvious that M (spreading ratio) >>1, the operation amount can be reduced by about 1/4 compared with the conventional method.

The delay time when the cross-correlation value takes the peak is ultimately required for the output of the reception timing detection circuit. When all the cross-correlation values in the short section corresponding to the impulse response time of the interpolation filter are small, a large signal is never output from the interpolation filter. Therefore the interpolation filter does not have to execute high accurate calculation for obtaining the delay time in the section where the cross-correlation value power is small. That is, the interpolation filter is so controlled not to operate in the section where the cross-correlation value power is smaller than a predetermined threshold value so as to reduce the calculation amount that should be done by the interpolation filter. The threshold value governing ON/OFF of the interpolation filter is decided by noise power and peak power of the predicted cross-correlation value as well as the calculation amount required to be reduced and the critical ratio causing detection failure owing to a peak error. For example, the threshold can be set to a value smaller than 1/10 of the peak power expected to be twice the noise power.

In this embodiment, a power measurement section 107 measures power of an output R of the correlator 102. Then a comparison section 108 compares the measured power with the threshold value decided as described above. The comparison section 108 outputs a signal for stopping the operation of the interpolation filter 103 in the section where the cross-correlation value power is smaller than the threshold value. Upon receiving the stop signal, the interpolation filter 103 outputs an output R of the correlator 102 as it has been input.

The phase of the reception signal may become gradually shifted between slots. It is thus impossible to improve Eb/No through in-phase combine that has been applied to the adjacent pilot symbols. So the phase component is removed by obtaining power of the correlation (sum of squares of the I component and Q component) in the power calculation section 104 and then the cross-correlation values between slots within the same delay time period are averaged by the averaging section 105.

The aforementioned averaging is executed in order to average dispersion owing to noise and variation owing to fading. Taking a large number of averaged slots may reduce dispersion owing to noise. However, the speed for tracking shadowing is decreased. Therefore it is preferable to keep the number of the averaged slot as minimum as possible. In case of a large number of pilot symbols (for example, 16), averaging is not necessarily required. The average value can be obtained in several different ways, for example, by splitting into blocks at every predetermined number of slot, obtaining the mobile average through sliding, or obtaining an index weighted mean value.

The cross-correlation power $Pn(\tau)$ to the delay $\tau$ at the nth slot can be obtained by the following equation:

$$Pn(\tau)=Rn(\tau)\times conj(Rn(\tau)).$$

When index weighting with an oblivion index $\lambda$, the averaged cross-correlation power Pave $n(\tau)$ to the delay $\tau$ at the nth slot is derived from the following equation:

$$\text{Pave } n(\tau)=\lambda\cdot\text{Pave } n(\tau)+(1-\lambda)\cdot Pn(i).$$

The peak detection circuit 106 obtains the delay time $\tau$ opt at which the averaged cross-correlation power Pave $n(\tau)$ takes a maximum value. If the data reception section (not shown) is formed as a RAKE receiver that can combine a plurality of multiple paths in maximum ratio, the peak detection circuit 106 obtains the number of peaks equivalent to that of the RAKE fingers in order of larger size for outputting the delay time $\tau$opt.

Figure 4:
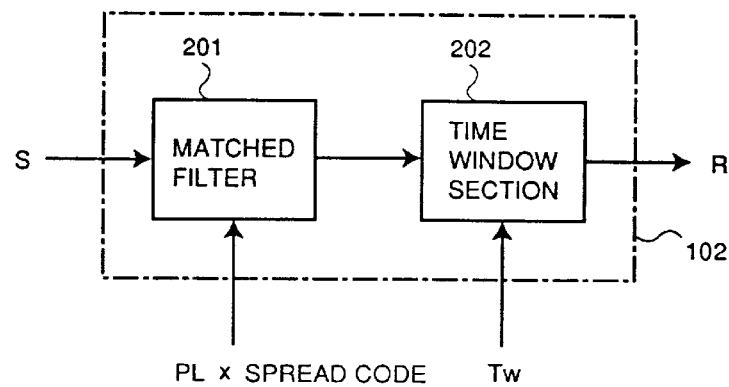
FIG. 4 is a block diagram of an example of a correlator of the reception timing detection circuit of the CDMA receiver shown in FIG. 1.

FIG. 4 is a block diagram of an example of the correlator 102 shown in FIG. 1.

Referring to FIG. 2, the correlator 102 comprises a matched filter 201 and a time window section 202.

The matched filter 201 is the filter matched with the series obtained by spreading the pilot symbol with the spread code. More specifically, it is realized by a FIR filter, taking the complex conjugate series of the aforementioned series as the tap coefficient.

The time window section 202 selectively allows only a cross-correlation value of the predetermined delay time range Tw to pass through.

Figure 5:
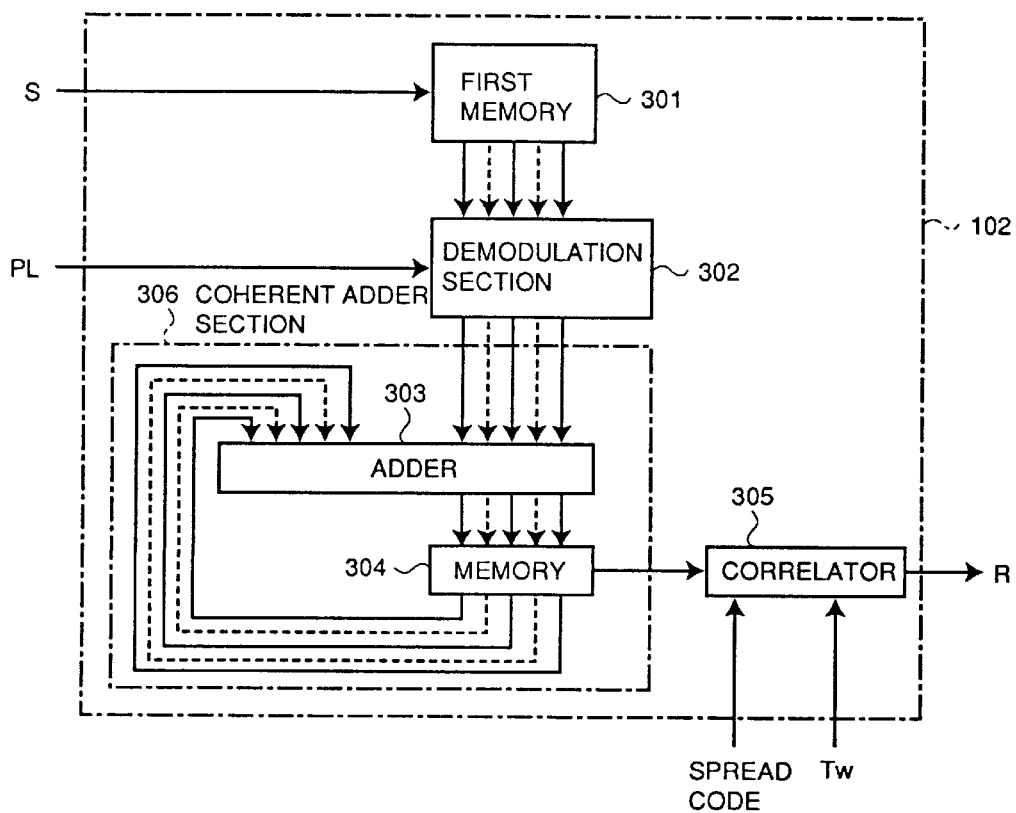
FIG. 5 is a block diagram of another example of a correlator of the reception timing detection circuit of the CDMA receiver shown in FIG. 1.

FIG. 5 is a block diagram of another example of the correlator 102 shown in FIG. 1. The circuit shown in FIG. 5 is effective only when the spread code length is equivalent to 1 symbol time of the pilot symbol. This type of circuit reduces the operation amount required for cross-correlation compared with the conventional circuit having the spread code length longer than 1 symbol.

Referring to FIG. 5, the correlator 102 comprises a first memory 301 of serial input parallel output type for storing a digital reception signal S for a time period obtained by adding 1 symbol time length of the pilot symbol to the time length of a predetermined delay range, an demodulation section 302 for demodulating the parallel output of the first memory 301 according to the pilot symbol code, an coherent adder section 306 provided with an adder 303 and a memory 304 for coherent adding the demodulated digital reception signal over a plurality of pilot symbols and a correlator 305 for obtaining a cross-correlation between the coherent added digital reception signal and the spread code within a predetermined delay range Tw.

In order to simplify the explanation how the correlation 102 shown in FIG. 5 operates, it is assumed that $\tau$min is equivalent to zero and $\tau$max is equivalent to 2M−1 (M chip represents 1 symbol time).

In the above condition, the size of the first memory 301 is 4M. After receiving a digital reception signal equivalent to 1 symbol time, the first memory 301 parallel outputs the reception signal equivalent to the time of last 2 symbols. That is, after receiving the digital reception signal corresponding to the (m+1)th symbol (m=0~Np−1) at the nth slot, the first memory 301 parallel outputs a digital reception signal for 4M samples obtained by the equation as below:

$$S(2\cdot L\cdot M\cdot n+2\cdot M\cdot m+i); i=0\sim 4M-1.$$

The demodulation circuit 302 multiplies a complex conjugate number of the mth pilot symbol PL(m) at the nth slot with all the above 4M samples.

The coherent adder 306 accumulation adds each 4M sample output from the demodulation circuit 302 to all Np pilot symbols. The head of the slot is cleared to zero and no addition is executed over the slots.

The coherent added 4M sample is obtained by the following equation;

$$\text{Save } n(i)\Sigma_{m=0-Np-1}S(2\cdot L\cdot M\cdot n+2\cdot M\cdot m+i)\times conj(PL(m));$$

where i=0~4M−1.

The correlator 305 calculates the coherent added signal Save (i); i=0–4M−1 and cross-correlation of the spread code series c(i); i=0~M−1 within the delay time $\tau$=0~2M−1.

The correlation $Rn(\tau)$ is obtained by the following equation:

$$Rn(\tau)=\Sigma_{i=0-m-1}\text{Save } n(2\cdot i+\tau)\times conj(c(i)).$$

The number of adding operation required for obtaining the cross-correlation in the range of $\tau$=0~2M−1 is 4M×Np+ $2M^2$. Increasing the number of the pilot symbol Np can reduce the number of the above adding operation.

Figure 6:
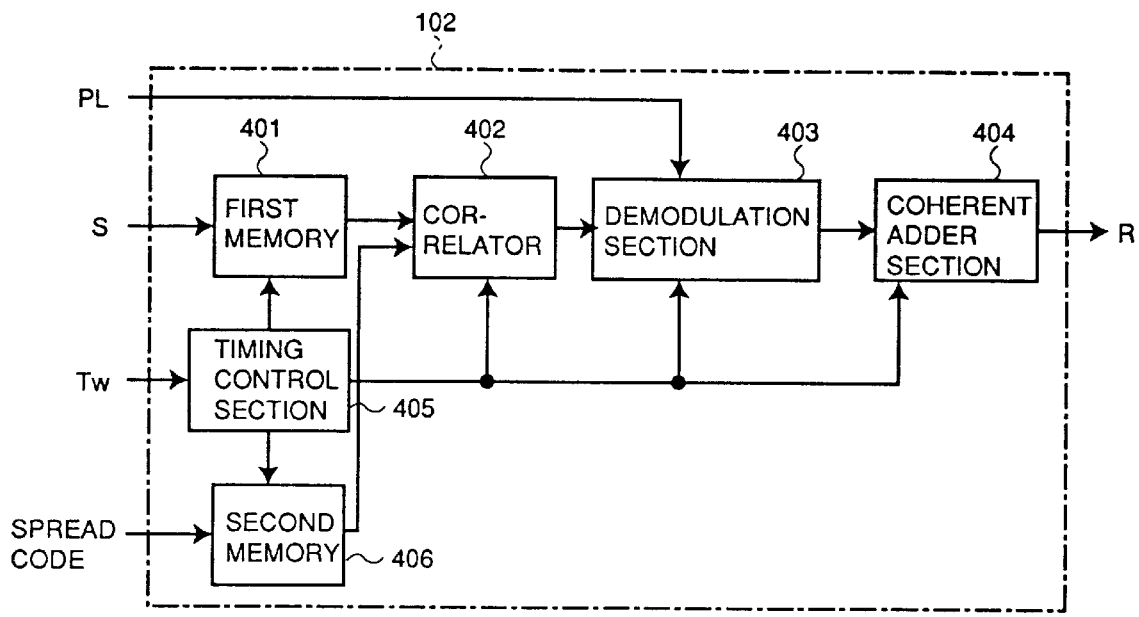
FIG. 6 is a block diagram of other example of a correlator of the reception timing detection circuit of the CDMA receiver shown in FIG. 1.

FIG. 6 is a block diagram of another example of the correlator 102 shown in FIG. 1.

Referring to FIG. 6, the correlator 102 comprises a first memory 401 for storing a digital reception signal S for a period obtained by adding a time length of the pilot symbol series to a predetermined time length of the delay range Tw, a second memory 406 for storing a spread code c corresponding to a pilot symbol PL, a correlator 402 for obtaining a cross-correlation per symbol by reading the digital reception signal S and the spread code from the first memory 401 and the second memory 406, respectively, an demodulation section 403 for demodulating the cross-correlation value output from the correlator 402 conforming to the pilot symbol PL, an coherent adder section 404 for accumulation adding the demodulated correlation signals over a plurality of pilot symbols, and a timing control section 405 for controlling the reception timing so that the pilot symbol is contained in the digital reception signal S accumulated in the first memory 401 and controlling to read from the first memory 401 and the second memory 406 repeatedly by sliding the timing until all cross-correlations are obtained within the predetermined delay range Tw.

Figure 7:
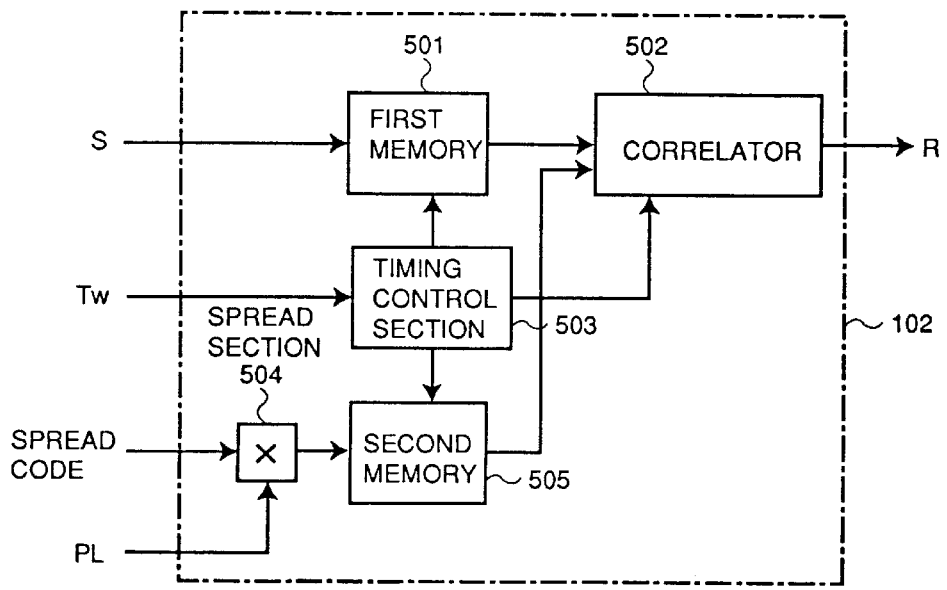
FIG. 7 is a block diagram of a still further example of a correlator of the reception timing detection circuit of the CDMA receiver shown in FIG. 1.

FIG. 7 is a block diagram of a further example of the correlator 102 shown in FIG. 1.

Referring to FIG. 7, this correlator 102 comprises a first memory 501 for storing a digital reception signal S for a period obtained by adding a time length of the pilot symbol series to a time length of a predetermined delay range Tw, a spread section 504 for spreading the pilot symbol PL with a spread code, a second memory 505 for storing the pilot symbol spread by the spread section 504, a correlator 502 for obtaining a cross-correlation by reading the digital reception signal S and the spread pilot symbol from the first memory 501 and the second memory 505, respectively and a timing control section 503 for controlling the reception timing so that the pilot symbol is contained in the digital reception signal S accumulated in the first memory 501 and controlling to read from the first memory 501 and the second memory 505 repeatedly by sliding the timing until all cross-correlations are obtained within the predetermined delay range Tw.

Each of the correlators 102 shown in FIG. 6 and FIG. 7 is the circuit that can be applied when the spread code has a longer symbol time length, i.e., direct spread using a long code, than 1 symbol time length of the pilot symbol. In FIG. 6, the correlation between the reception data and the spread code is obtained (de-spread) in the same manner as normal data reception and demodulation is executed using a known pilot symbol. Then coherent adding is executed by removing the demodulation component. In FIG. 7, the series in which the pilot symbol is preliminarily spread is obtained and the cross-correlation between the known series and the reception signal is directly obtained. The method shown in FIG. 6 can provide the correlation value at every symbol as the result of the middle of the process. In order to obtain the cross-correlation series as the objective of the present invention, the circuit shown in FIG. 7 should be better choice because of its simple construction.

The operation of the correlator 102 shown in FIG. 7 is described.

Figure 8:
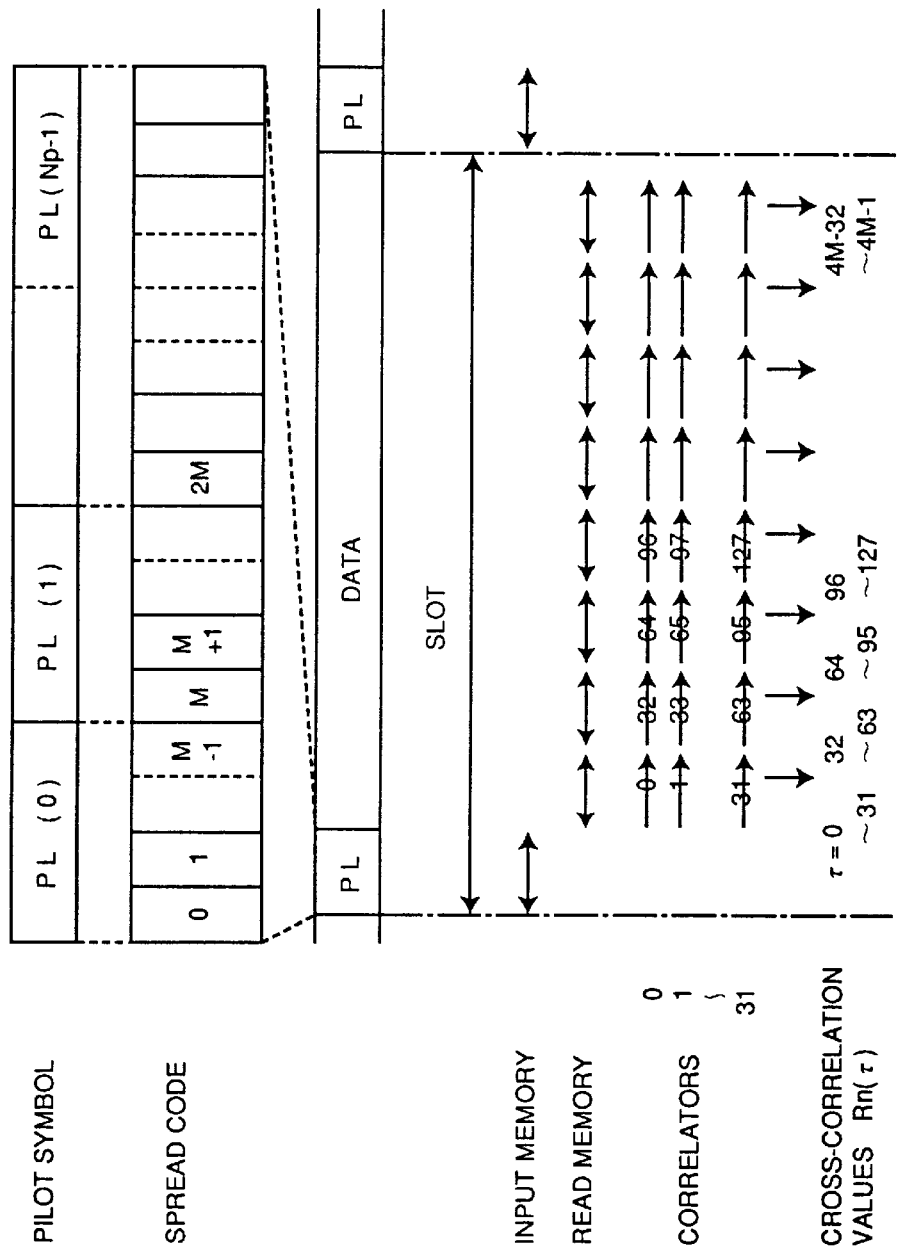
FIG. 8 is a time chart representing an operation of the correlator shown in FIG. 7.

FIG. 8 is a time chart showing the operation of the correlator 102 shown in FIG. 7.

Referring to FIG. 7 and FIG. 8, after the digital reception signal corresponding to the pilot symbol and the series where the pilot symbol is spread are input in the first memory 501 and the second memory 505, respectively, the data section is repeatedly read during reception so that the cross-correlation operation is executed repeatedly. FIG. 8 represents that the correlator 502 parallel calculates to obtain the cross-correlation with respect to 32 delay times. The number of parallel calculation that can be done is defined by a trade-off relationship between the hardware size and the cross-correlation operation time. Therefore an optimum number can be decided by considering the spreading ratio, delay time range for searching the peak, slot cycle, process clock rate and the like. In this example, 32 units of parallel correlators are used to obtain 4M cross-correlation values. The reception signal and the spread pilot symbol series are read from the memories repeatedly by 4M/32 times for executing correlation operation.

Figure 9:
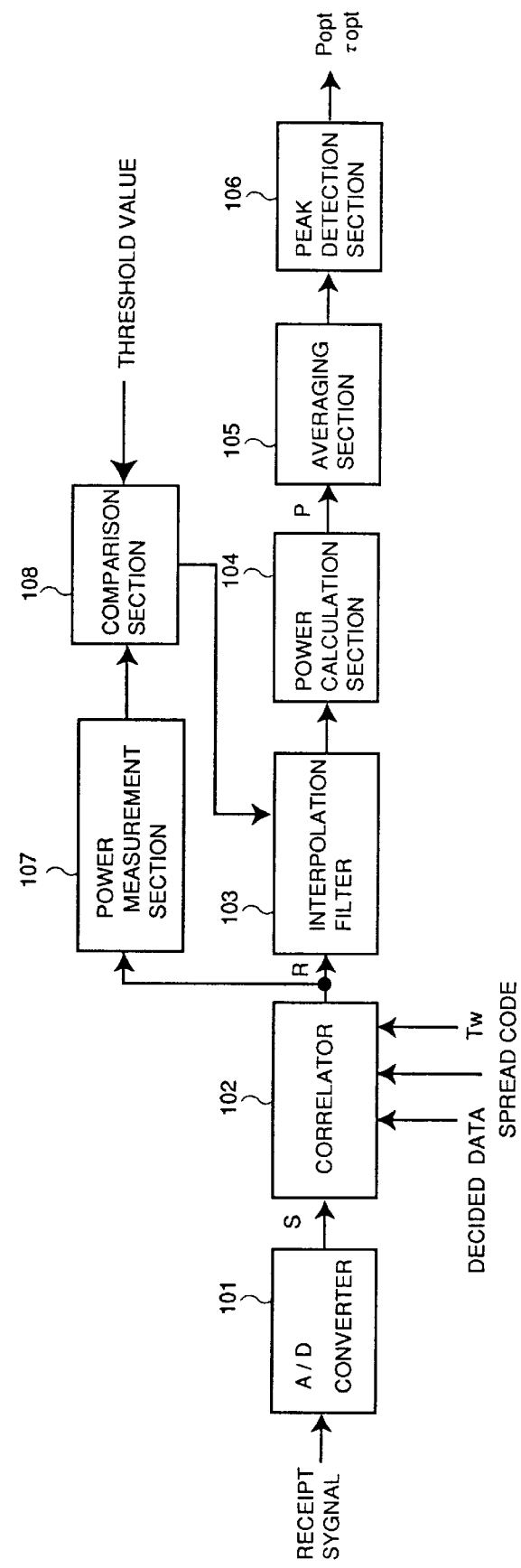
FIG. 9 is a block diagram of a reception timing detection circuit of a CDMA receiver of a second embodiment of the present invention.

FIG. 9 is a block diagram showing a reception timing detection circuit of a CDMA receiver of a second embodiment of the present invention.

Referring to FIG. 9, the reception timing detection circuit of the CDMA receiver processes decided data obtained by deciding reception data of a reception signal as a known signal instead of using the pilot symbol. That is, the reception timing detection circuit of the CDMA receiver shown in FIG. 9 is identical to the reception timing detection circuit of the CDMA receiver as shown in FIG. 1 except that the known signal input to the correlator 102 is not the pilot symbol but the decided data.

Figure 10:
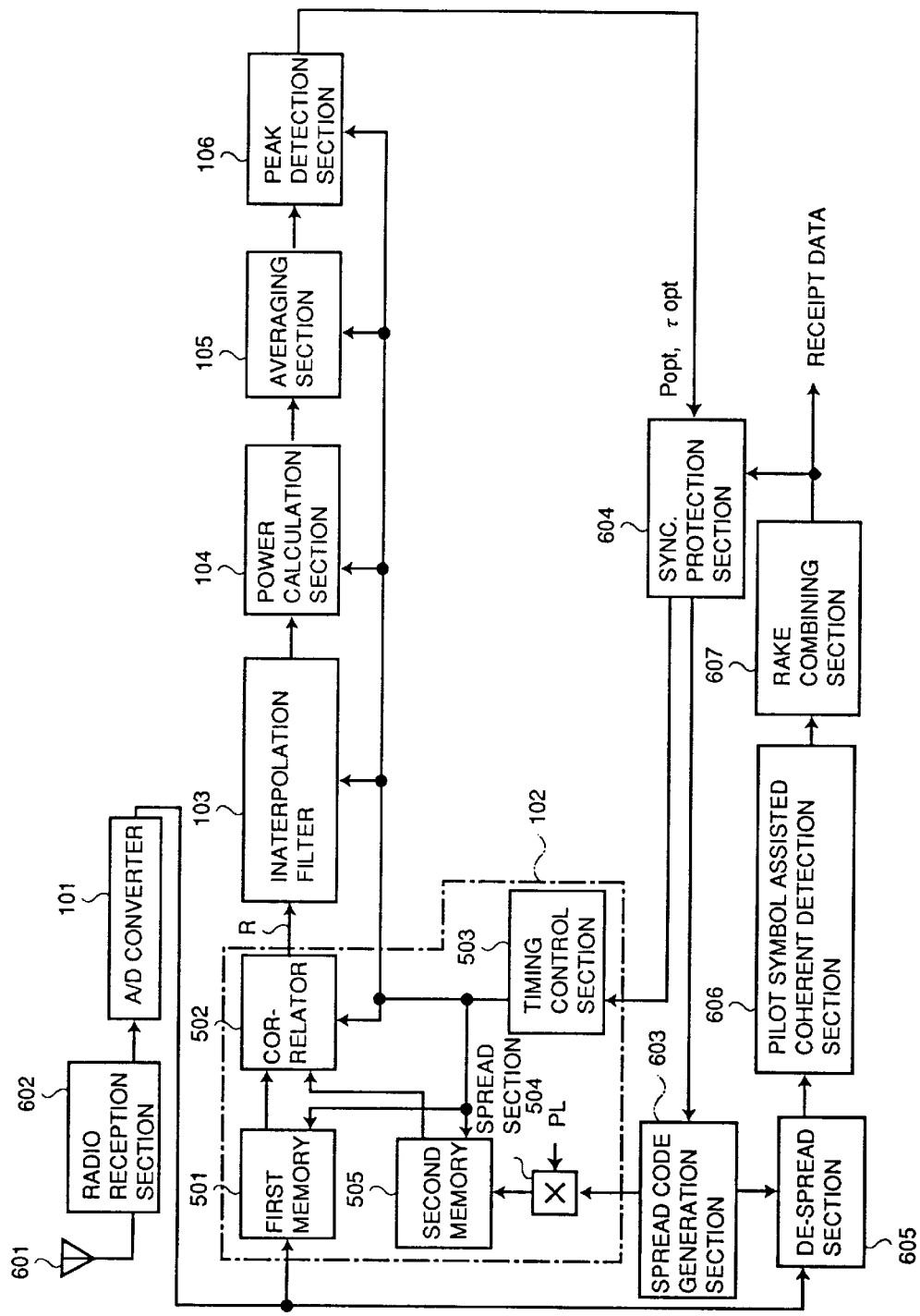
FIG. 10 is a block diagram of the CDMA receiver comprising the reception timing detection circuit shown in FIG. 1.

FIG. 10 is a block diagram of a CDMA receiver comprising the reception timing detection circuit shown in FIG. 1. Referring to FIG. 10, the CDMA receiver comprises the correlator 102 as shown in FIG. 7.

The CDMA receiver comprises a radio reception section 602 for converting a radio signal received via an antenna 601 into a complex base band signal.

An A/D converter 101 digitizes the complex base band signal into a digital reception signal. A first memory 501 stores the digital reception signal. A spread section 504 spreads the pilot symbol PL with a spread code. A second memory 505 stores the spread pilot symbol series. A correlator 502 reads the digital reception signal and the spread pilot symbol from the first memory 501 and the second memory 505, respectively for obtaining a cross-correlation.

A power calculation section 104 calculates power of the cross-correlation series that has been interpolated by an interpolation filter 103 as the cross-correlation power. An averaging section 105 averages the cross-correlation power within the same delay time over a plurality of slots. A peak detection section 106 detects a peak of the averaged cross-correlation power.

A timing control section 503 controls the respective operation timings of the first and the second memories 501 and 505, correlator 502, interpolation filter 103, power calculation section 104, averaging section 105 and peak detection section 106.

A spread code generation section 603 generates a spread code and supplies the spread code to the spread section 504 and an de-spread section 605. The de-spread section 605 outputs a pre-spread data signal by multiplying a complex conjugate of the spread code by the digital reception signal and integrating the multiplication result by 1 symbol. A pilot symbol assisted coherent detection section 606 obtains a reference phase at each symbol timing within the slot through straight interpolation, taking a known pilot symbol inserted to the head of 2 successive slots as a reference signal for coherent detection. A RAKE combining section 607 comprising an de-spread section identical to the de-spread section 605 and a plurality of pilot symbol assisted coherent detection sections identical to the pilot symbol assisted coherent detection section 606 outputs reception data by wave detecting each path of the multiple path transmission channel and combining in a maximum ratio. A sync. protection section 604 monitors errors of an optimum reception timing τopt detected by the peak detection section 106, the peak power Popt at the optimum reception timing τopt and a sync. signal contained in the reception data (The known pilot symbol can be used as the sync. signal.) and controls the spread code generation section 603 and the timing control section 503 so that sync. status is maintained.

Figure 11:
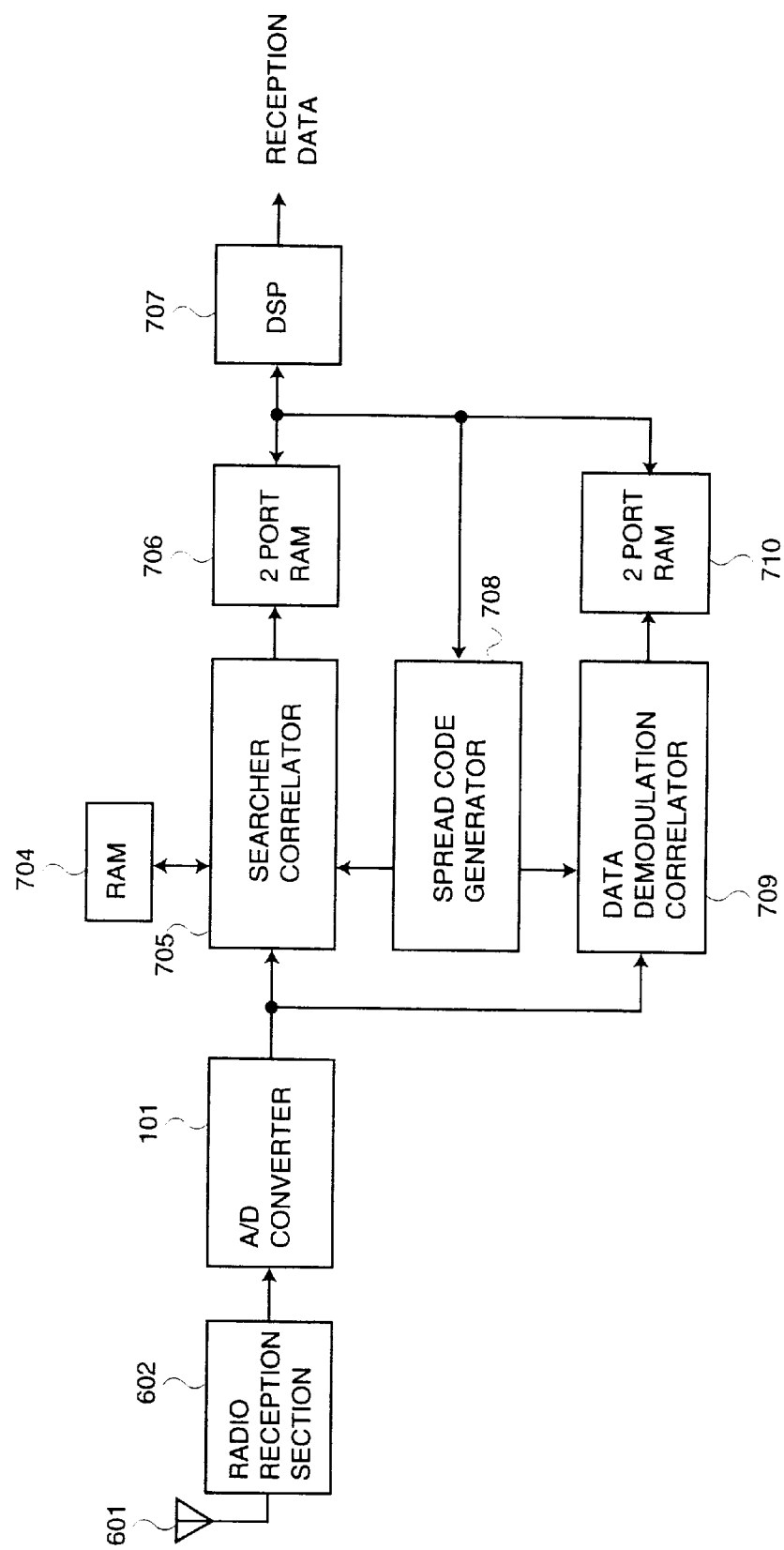
FIG. 11 is a block diagram of another type of the CDMA receiver that realizes the same function performed by the CDMA receiver shown in FIG. 10.

FIG. 11 is a block diagram of another example of the CDMA receiver that realizes the same function as performed by the CDMA receiver as shown in FIG. 10.

Referring to FIG. 11, the CDMA receiver comprises the identical elements to those designated as the same reference numerals. The CDMA receiver comprises a searcher correlator 705 for storing a correlation series between the digital reception signal and the spread pilot symbol series at each slot in a 2 port RAM 706, a RAM 704 for temporarily storing reception data used by the searcher correlator 705, a spread code generator 708 for generating a spread code and a spread pilot symbol series and supplying them to the searcher correlator 705 and the data demodulation correlator 709, a data demodulation correlator 709 for de-spreading a digital signal to a plurality of multiple path signals with a plurality of RAKE fingers in accordance with a reception delay ordered by a DSP (digital signal processor) 707 and storing the de-spread signal in the 2 port RMA 710 and the DSP 707 for setting an optimum reception timing in the spread code generator 708 by detecting the peak of the cross-correlation series stored in the 2 port RAM 706 by the searcher correlator 705 with respect to the interpolation filter operation, power calculation, slot-to-slot averaging and the number of RAKE fingers and reading the de-spread signal written in the 2 port RAM by the data demodulation correlator 709, combining at a maximum ratio (RAKE combination) by pilot symbol assisted coherent detecting the respective RAKE fingers and then deciding the reception data.

The searcher correlator 705, spread code generator 708 and data demodulation correlator 709 can be formed by a hardware, for example, gate array (G/A), exclusive LSI, and the like. Assuming that the chip rate is set to 4.096 Mcps and the symbol rate to 256 ksps, the exclusive hardware may process the chip rate requiring simple and high-rate processing. While the DSP firmware may realize symbol rate processing requiring relatively a low rate but complex processing. As a result, the most desirable embodiment can be realized.

A first advantageous effect of the present invention is that the probability and accuracy for appropriately detecting the peak point of the delay profile can be improved even if the Eb/No per path is low. Therefore the appropriate reception timing can be always established, leading to the improved reception quality. Furthermore, as the present invention meets desired reception quality even under the lower Eb/No condition, the capacity of the cellular system using the CDMA and the cell radius covered by 1 base station can be enlarged.

As the first reason for the above-described effect provided by the present invention, the delay profile is provided by obtaining a cross-correlation between a known signal and the reception signal over a plurality of symbols or coherent adding over a plurality of symbols (normally the number of pilot symbols per slot). And then the power (sum of squares) is obtained. As a result, the power of the noise component contained in the cross-correlation value is reduced to 1/(number of pilot symbols), which is smaller than that of the prior art case. Assuming that the number of the pilot symbol per slot is 16, the power of the noise component can be reduced by about 12 dB.

As the second reason, since the same reception signal is repeatedly used for calculating the correlation value with different delays, the level relationship among cross-correlation values with different delays can be strictly maintained irrespective of large variation of the reception level owing to fading. Therefore, the present invention can completely solve such problem that the cross-correlation value obtained at a moment when the reception level is raised by fading exceeds the cross-correlation value of the correct peak point obtained at a moment when the reception level is low.

As the third reason, in the present invention, the cross-correlation value is obtained at 1/2 chip interval and then it is obtained at a shorter interval using an interpolation filter. Accordingly more accurate peak point (delay time) of the delay profile can be obtained. The present invention greatly improves the accuracy of detecting the reception timing without increasing processing amount.

A second advantageous effect of the present invention is that the operation amount required for obtaining the peak of the delay profile can be reduced.

This is because that the present invention requires to obtain the correlation value only at 1/2 interval in order to keep deterioration of the Eb/No required to an optimum reception timing to be 1 dB or less. While the prior art requires to obtain power of the correlation value at 1/4 interval. Since the noise contained in the cross-correlation value can be reduced, the number of averaging processings for restraining the dispersion of the noise power can also be decreased.

A third advantageous effect of the present invention is that the size of the hardware used for the base station system can be reduced.

This is because that as the circuit of the present invention realizes all functions of the initial sync. capture (initial search), new path capture (search) and sync. tracking by replacing two circuits, initial sync. capture circuit (search circuit) and sync. tracking circuit (for example, DLL (Delay Lock Loop)) that have been required to be equipped with the conventional system.

Referring to FIG. 1 and FIG. 9, the power measurement section 107 and comparison section 108 are provided and the interpolation filter 103 is operated at a predetermined threshold value or more. However the objective of the present invention can be achieved by operating the interpolation filter 103 irrespective of the threshold value under no provision of the power measurement section 107 and comparison section 108.

The entire disclosure of Japanese Patent Application No. 8-185103 filed on Jul. 15, 1996 including specification, claims, drawing and summary are incorporated herein by reference in its entirety.

What is claimed is:

1. A reception timing detection circuit of a CDMA receiver used for a mobile communication system using a direct spread code division multiple access method comprising:

correlation means for obtaining a cross-correlation between a reception signal and a known signal series periodically within a predetermined lag and outputting a cross-correlation signal indicating said obtained cross-correlation;

an interpolation filter for re-sampling said cross-correlation signal at a frequency higher than a sampling frequency for said cross-correlation signal and outputting said re-sampled cross-correlation signal;

power calculation means for calculating power of said re-sampled cross-correlation signal;

averaging means for averaging said calculated power of cross-correlation signal over a plurality of cycles; and peak detection means for detecting a peak of said averaged power of cross-correlation signal and determining a timing at which said peak is detected as a reception timing.

2. The reception timing detection circuit of a CDMA receiver of claim 1, wherein said known signal series is obtained by spreading a known pilot symbol inserted to said reception signal at predetermined period with a spread code.

3. The reception timing detection circuit of a CDMA receiver of claim 1, wherein said known signal series is obtained by re-spreading a signal series produced by de-spreading said reception signal with a spread code.

4. The reception timing detection circuit of a CDMA receiver of claim 1, wherein said correlation means comprises a matched filter that matches a series produced by spreading a known signal series with a spread code and time window means that allows a signal output from said matched filter to pass through within a predetermined period only.

5. The reception timing detection circuit of a CDMA receiver of claim 1, wherein a cycle of a spread code is equivalent to that of a pilot symbol and said correlation means comprises:

a first memory of a serial input parallel output type for storing a reception signal for a period obtained by adding 1 symbol time length of said pilot symbol to a time length of a predetermined period;

demodulating means for demodulating a parallel output of said first memory based on a pilot symbol code;

coherent adder means for coherent adding said demodulated reception signals over a plurality of pilot symbols; and a correlator for obtaining a cross-correlation between said coherent added reception signal and a spread code within a predetermined period.

6. The reception timing detection circuit of a CDMA receiver of claim 1, wherein said correlation means comprises:

a first memory for storing a reception signal for a period obtained by adding a time length of a pilot symbol series to a time length of a predetermined period;

a second memory for storing a spread code corresponding to a pilot symbol;

a correlator for obtaining a cross-correlation at each symbol by reading a reception signal and a spread code from said first memory and said second memory;

demodulating means for demodulating a correlation value output from said correlator based on a pilot symbol code;

coherent adder means for accumulation adding said demodulated correlation signals over a plurality of pilot symbols; and timing control means for controlling a reception timing so that a pilot symbol is contained in a reception signal stored in said first memory and controlling a timing for reading said first memory and second memory until all cross-correlations are obtained within a predetermined period.

7. The reception timing detection circuit of a CDMA receiver of claim 1, wherein said correlation means comprises:

a first memory for storing a reception signal for a period obtained by adding a time length of a pilot symbol series to a time length of a predetermined period;

spreading means for spreading a pilot symbol with a spread code;

a second memory for storing said pilot symbol spread by said spread means;

a correlator for reading a reception signal and a spread pilot symbol from said first memory and said second memory, respectively and obtaining a cross-correlation; and timing control means for controlling a reception timing so that a pilot symbol is contained in a reception signal stored in said first memory and controlling a timing for reading said first memory and said second memory until all cross-correlations are obtained within a predetermined period.

8. The reception timing detection circuit of a CDMA receiver of claim 1, wherein said correlation means further comprises means for obtaining a cross-correlation within a time corresponding to the time required for electric wave to propagate between a base station and a mobile station and outputting a cross-correlation signal indicating said obtained cross-correlation.

9. The reception timing detection circuit of a CDMA receiver of claim 1, wherein said interpolation filter operates in a segment where power of a cross-correlation value output from said correlation means exceeds a predetermined threshold value.

10. A reception timing detection circuit of a CDMA receiver used for a mobile communication system using a direct spread code division multiple access method comprising:

an A/D converter for converting a reception signal into a digital reception signal;

a matched filter for matching a signal series produced by spreading a pilot symbol with a spread code, obtaining a cross-correlation between said signal series and said digital reception signal and outputting a cross-correlation signal;

time window means for allowing said cross-correlation signal output from said matched filter to pass through within a delay range only;

an interpolation filter for re-sampling said cross-correlation signal at a frequency higher than a sampling frequency for a cross-correlation signal that has passed through said time window means and outputting said re-sampled cross-correlation signal;

power calculation means for calculating power of said re-sampled cross-correlation signal;

averaging means for averaging said calculated power of cross-correlation signal over a plurality of cycles; and peak detection means for detecting a peak of said averaged power of cross-correlation signal and determining a timing when said peak is detected as a reception timing.

11. A reception timing detection circuit of a CDMA receiver used for a mobile communication system using a direct spread code division multiple access method comprising:

an A/D converter for converting a reception signal into a digital reception signal;

a first memory of a serial input parallel output type for storing said digital reception signal for a period obtained by adding 1 symbol time length of a pilot symbol to a time length of a predetermined period;

demodulating means for demodulating a parallel output of said first memory based on a pilot symbol code;

coherent adder means for coherent adding said demodulated reception signal over a plurality of pilot symbols;

a correlator for obtaining a cross-correlation between said coherent added reception signal and a spread code and outputting a cross-correlation signal;

an interpolation filter for re-sampling said cross-correlation signal at a frequency higher than a sampling frequency for said cross-correlation signal and outputting said re-sampled cross-correlation signal;

power calculation means for calculating said power of re-sampled cross-correlation signal, averaging means for averaging said calculated power of cross-correlation over a plurality of cycles; and peak detection means for detecting a peak of said averaged power of cross-correlation signal and determining a timing when said peak is detected as a reception timing.

12. A reception timing detection circuit of a CDMA receiver for a mobile communication system using a direct spread code division multiple access method comprising:

an A/D converter for converting a reception signal into a digital reception signal;

a first memory for storing said digital reception signal for a period obtained by adding a time length of a pilot symbol series to a time length of a predetermined period;

a second memory for storing a spread code corresponding to a pilot symbol;

a correlator for obtaining a cross-correlation at each symbol by reading a reception signal and a spread code from said first memory and said second memory, respectively;

demodulating means for demodulating a correlation value output from said correlator conforming to a pilot symbol code;

coherent adder means for accumulation adding said demodulated correlation values over a plurality of pilot symbols and outputting a cross-correlation signal;

timing control means for controlling a reception timing so that a pilot symbol is contained in said reception signal stored in said first memory and controlling a timing for reading said first memory and said second memory;

an interpolation filter for re-sampling said cross-correlation signal at a frequency higher than a sampling frequency for said cross-correlation signal and outputting said re-sampled signal;

power calculation means for calculating power of said re-sampled cross-correlation;

averaging means for averaging said calculated power of cross-correlation signal over a plurality of cycles; and peak detection means for detecting a peak of said averaged power of cross-correlation signal and determining a timing when said peak is detected as a reception timing.

13. A reception timing detection circuit of a CDMA receiver used for a mobile communication system using a direct spread code division multiple access method comprising:

an A/D converter for converting a reception signal into a digital reception signal;

a first memory for storing said digital reception signal for a period obtained by adding a time length of a pilot symbol series to a time length of a predetermined period;

spread means for spreading a pilot symbol with said spread means;

a second memory for storing a pilot symbol spread with said spread means;

a correlator for obtaining a cross-correlation by reading a reception signal and a spread pilot symbol from said first memory and said second memory, respectively and outputting a cross-correlation signal;

timing control means for controlling a reception timing so that a pilot symbol is contained in said reception signal stored in said first memory and controlling a timing for reading said first memory and said second memory;

an interpolation filter for re-sampling said cross-correlation signal at a frequency higher than a sampling frequency for said cross-correlation signal and outputting said re-sampled signal;

power calculation means for calculating power of said re-sampled cross-correlation signal;

averaging means for averaging said calculated power of cross-correlation signal over a plurality of cycles; and peak detection means for detecting a peak of said averaged power of cross-correlation signal and determining a timing when said peak is detected as a reception timing.

14. A method of detecting a reception timing of a CDMA receiver for a mobile communication system using a direct spread code division multiple access method comprising the steps of:

obtaining a cross-correlation value between a reception signal and a known signal series periodically within a predetermined lag;

re-sampling said cross-correlation value at a frequency higher than a sampling frequency for said obtained cross-correlation value;

calculating power of said re-sampled cross-correlation value;

averaging said calculated power of cross-correlation value over a plurality of cycles; and detecting a peak of said averaged power of cross-correlation value and determining a timing when said peak is detected as a reception timing.

15. The method of detecting a reception timing of a CDMA receiver of claim 14, wherein said known signal series is obtained by spreading a known pilot symbol inserted to said reception signal at a predetermined period with a spread code.

16. The method of detecting a reception timing of a CDMA receiver of claim 14, wherein said known signal series is obtained by re-spreading said signal series resulted from de-spreading said reception signal with a spread code.

* * * * *